United States Patent [19]

Ogino

[11] Patent Number: 4,924,154
[45] Date of Patent: May 8, 1990

[54] REVERSIBLE MOTOR DRIVE CONTROL CIRCUIT

[75] Inventor: Seiichi Ogino, Gumma, Japan

[73] Assignee: Mitsuba Electric Manufacturing Co., Ltd., Japan

[21] Appl. No.: 259,069

[22] Filed: Oct. 18, 1988

[30] Foreign Application Priority Data

Oct. 19, 1987 [JP] Japan .................. 62-159820[U]

[51] Int. Cl.⁵ .............................................. H02P 1/22
[52] U.S. Cl. ..................................... 318/286; 318/282
[58] Field of Search ................. 318/280, 282-286, 318/264, 266, 445, 469, 468

[56] References Cited

U.S. PATENT DOCUMENTS

| | | | |
|---|---|---|---|
| 4,138,630 | 2/1979 | Graham | 318/282 X |
| 4,369,399 | 1/1983 | Lee et al. | 318/266 X |
| 4,393,343 | 7/1983 | Matsuoka et al. | 318/282 X |
| 4,410,061 | 10/1983 | Terabayashi | 180/268 |
| 4,562,387 | 12/1985 | Lenhoff | 318/285 |
| 4,678,975 | 7/1987 | Vrabel et al. | 318/286 X |
| 4,796,011 | 1/1989 | Lemirande et al. | 318/266 X |

FOREIGN PATENT DOCUMENTS

| | | | |
|---|---|---|---|
| 6039302 | 4/1979 | Japan . | |
| 520678 | 5/1940 | United Kingdom | 318/285 |
| 2045467 | 2/1980 | United Kingdom | 318/285 |

Primary Examiner—Vit W. Miska
Assistant Examiner—A. Jonathan Wysocki
Attorney, Agent, or Firm—Skjerven, Morrill, MacPherson, Franklin & Friel

[57] ABSTRACT

A control circuit for reversible control of a motor including a switch for selecting the rotational direction of a motor, a self-retaining driver circuit for driving the motor in the direction selected by the switch, a timer circuit which is initialized when the switch is actuated irrespective of the selected rotational direction of the motor and resets the driver circuit after the elapse of a certain period of time. The driver circuit may also be connected to a limit switch for resetting the driver circuit when the motor has reached an end of its stroke. Thus, the overloading of the motor is minimized even when the motion of the motor is obstructed at an intermediate point of its stroke, and the motor can reach an end of its stroke without fail even when the switch is actuated repeatedly.

8 Claims, 2 Drawing Sheets

REVERSIBLE MOTOR DRIVE CONTROL CIRCUIT

TECHNICAL FIELD

The present invention relates to a reversible motor control circuit for controlling the rotation of electric motors in a reversible manner, and in particular to such a motor drive control circuit which is suitable for use in a passive seat belt system.

BACKGROUND OF THE INVENTION

In many applications, it is necessary for the motor to turn in either direction as required, and various reversible motor drive control circuits have been proposed heretofore. For instance, in a passive seat belt system for a motor vehicle, one end of the seat belt is fixedly secured to the vehicle body but the other is required to move between a first position for restraining the vehicle occupant and a second position for relieving the occupant from the restraint of the seat belt, according to the intention of the occupant to get on or off the vehicle. The intention of the occupant may be detected by a switch for detecting the closing and opening of the vehicle door, a switch for detecting pressure upon the seat, and other means. Typically, the movable end of the seat belt is actuated with an electric motor, and the activation and the rotational direction of the motor are both required to be controlled as required.

U.S. Pat. No. 4,410,016 discloses a control circuit which comprises a timer circuit for keeping a motor rotating for a predetermined period time. This time period is longer than the time period which is normally required for the movable end of the seat belt to travel from one end of the stroke to the other, and the rotational direction of the motion is determined depending on whether the door is open or closed. Therefore, according to this proposal, the wasteful activation of the motor is prevented because the supply of electric power is discontinued after the elapse of the predetermined time period, but if the door is repeatedly closed and opened after the timer has already started running, the other end of the seat belt will reciprocate, and upon elapsing of the predetermined time period, the movable end of the seat belt may be located at an intermediate point of its full stroke to a considerable inconvenience of the vehicle occupant.

To eliminate this inconvenience, Japanese utility model publication No. 60-39302 proposes the provision of a pair of timer circuits which are set and reset in a mutually exclusive manner so that one of the timer circuits is reset when the other timer circuit is set. According to this proposal, since each of the timer circuits is initialized or, in other words, starts running from the start every time the door is either closed or opened, the motor keeps rotating for a predetermined time period following the detection of the last door opening or closing action, and either one of the timer circuits continues to drive the movable end of the seat belt to one of the terminal ends of the stroke thereof without fail.

However, this proposal has the disadvantage that two timer circuits are required for each passive seat belt system. Since a timer circuit requires a relatively large capacitor or complex circuitry to define a period of time such as 15 seconds which is longer than the normal time period for the moveable end of the seat belt to travel from one end of its stroke to this other, and such circuitry tends to be large in size and high in cost.

BRIEF SUMMARY OF THE INVENTION

In view of such shortcomings of the prior art, a primary object of the present invention is to provide a reversible motor control circuit which would not fail to drive the motor to each end of its stroke under any circumstance and, yet, is simple in structure and economical to manufacture.

This and other objects of the present invention can be accomplished by providing a control circuit for reversible control of the rotation of a motor, comprising: switch means for producing a selection signal for selecting the rotational direction of the motor; timer means which is initialized every time the switch means is actuated and produces a pulse signal when a predetermined time period has passed from the time it is initialized; driver means which can take a first state for driving the motor in a first direction, a second state for driving the motor in a second direction, and a third state for not driving the motor in either direction; the driver means comprising a first input for receiving the selection signal from the switch means to produce the first or second state of the driver means selected by the switch means, self retaining means which keeps the driver means in the first or second selected state once and whenever either the first or second state of the driver means is produced, and a reset input for receiving the pulse signal from the timer means for breaking the self retained state of the driver means to produce the third state of the driver means.

Thus, the overloading of the motor is minimized even when the motion of the motor is obstructed at an intermediate point of its stroke, and the motor can reach each end of its stroke without fail even when the switch means is actuated repeatedly in a short span of time. Since the single, common timer means can be used irrespective of the rotational direction of the motor to define the limit of the time period for driving the motor, the cost and the size of the control circuit are both reduced through elimination the need for a large capacitor or a complicated circuit.

According to a preferred embodiment of the present invention, the switch means comprises a pair of one-shot multivibrators, an inverter connected to the input of one of the multivibrators, and a switch connected to the inputs of the other multivibrator and the inverter. Further, the driver means comprises a pair of driver circuits each of which is connected between the output of the one-shot multivibrator and one end of the motor, and the outputs of the one-shot multivibrator are connected to the inputs of an OR circuit whose output is connected to the timer means.

Each of the driver circuit may comprise either a self-retaining circuit including a positive feed-back line or a flip-flop circuit.

If the driver means comprises a second reset input which receives an output from a limit switch for detecting an end of the stroke of the motor, the overloading of the motor is entirely prevented under normal condition.

According to the present invention, it is also possible to share the timer means with a plurality of sets of the switch means and the driver means for controlling two different motors.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
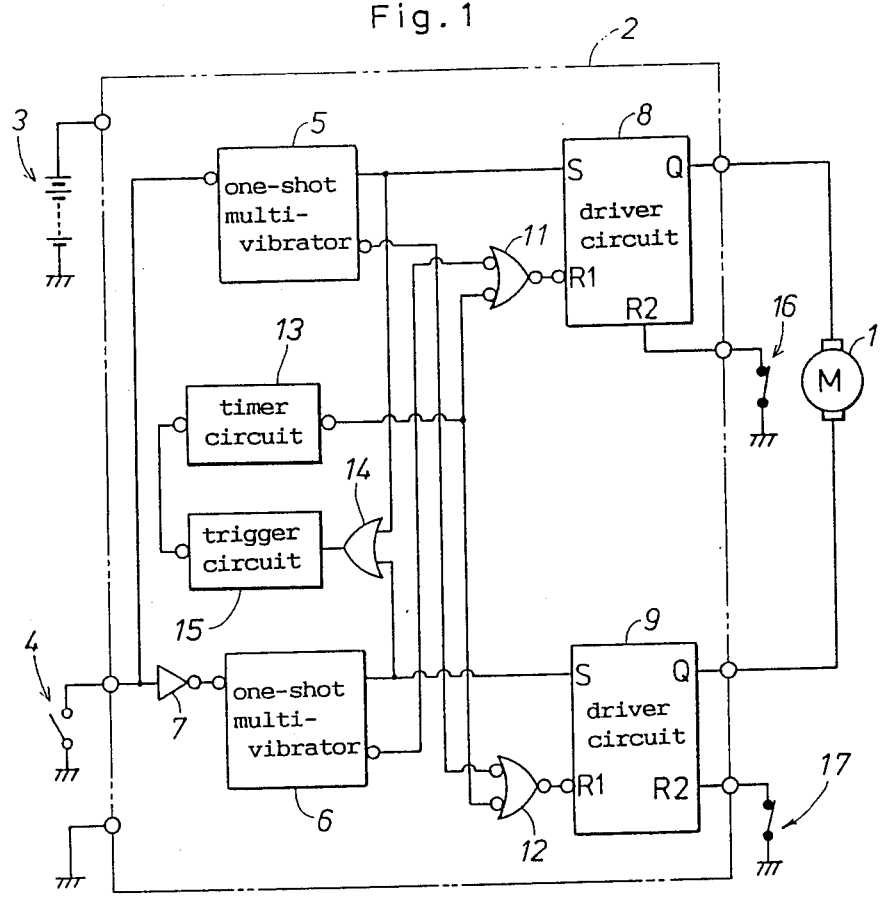
FIG. 1 is a block diagram of a first preferred embodiment of the present invention.

FIG. 1 shows a motor drive control circuit for a passive seat belt system according to the present invention. A motor 1 and a control circuit 2 for this motor are provided for actuating an end of a seat belt (not shown in the drawings) between a first position for restraining a vehicle occupant and a second position for removing the restraint upon him, according to the opening and closing of the vehicle door which is detected by a door switch 4. This control circuit 2 receives a supply of electric power, for instance from an on-board battery 3.

The control circuit 2 comprises a pair of one-shot multivibrators 5 and 6. The door switch 4, which closes when the door is opened and opens when the door is closed, is connected directly to the input of one of the one-shot multivibrators 5 and, via an inverter 7, to the input of the other one-shot multivibrator 6. These one-shot multivibrators 5 and 6 produce a pulse of a short duration upon pulling up of their inputs.

The output of the first one-shot multivibrator 5 is connected to a set terminal S of a first driver circuit 8 for driving the motor 1 in the normal direction while the output of the second one-shot multivibrator 6 is connected to a set terminal S of a second driver circuit 9 for driving the motor 1 in the reverse direction. The inverted output of the first one-shot multivibrator 5 is connected to a first reset (inverted) input $R_1$ of the second driver circuit 9 by way of an OR circuit 12, and the inverted output of the second one-shot multivibrator 6 is connected to a first reset (inverted) input $R_1$ of the first driver circuit 8 by way of another OR circuit 11.

The output terminals of the two one-shot multivibrators 5 and 6 are also connected to the two inputs of an OR circuit 14, and the output of the OR circuit 14 is connected to a timer circuit 13 by way of a trigger circuit 15. The output terminal of the timer circuit 13 is connected to the other inputs of the OR circuits 11 and 12.

This timer circuit 13 is initialized or set anew whenever the output from either one of the one-shot multivibrators 5 and 6 is supplied to the trigger circuit 15, and the output of the timer circuit 13 continues to be high for a predetermined time period, for instance 15 seconds, which is sufficient for the moveable end of the seat belt to travel from one of the stroke to the other.

Further, second reset terminals $R_2$ of the driver circuits 8 and 9 are connected to limit switches 16 and 17 which are normally closed but open when the moveable end of the seat belt has reached the corresponding ends of the stroke thereof.

Figure 2:
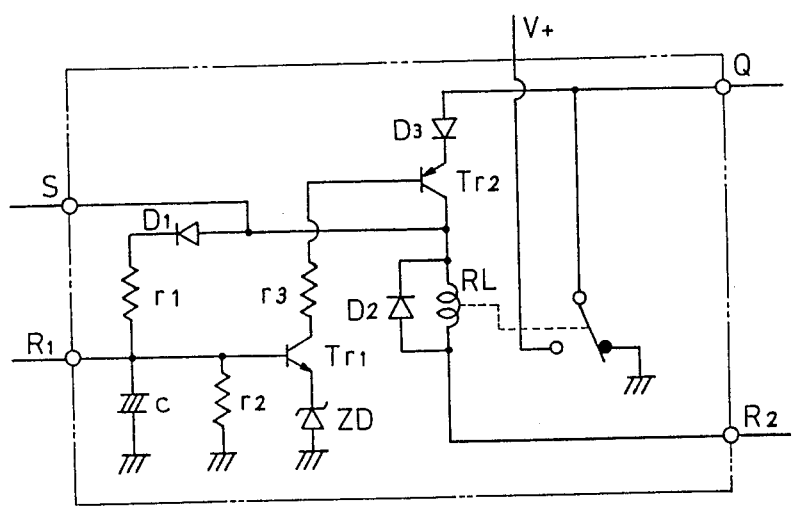
FIG. 2 is a circuit diagram of an embodiment of the driver circuit which can be used in the first embodiment of the present invention.

FIG. 2 shows an example of the driver circuit 8. Since the driver circuit 9 is identical to the driver circuit 8, only the first driver circuit 8 is described in the following.

The set terminal S of the driver circuit 8 is connected to the base of a (NPN) transistor $Tr_1$ by way of a diode $D_1$ and a resistor $r_1$. The base of the transistor $Tr_1$ is also grounded by a parallel combination of a capacitor c and a resistor $r_2$. The emitter of the transistor $Tr_1$ is grounded by way of a zener diode ZD while the collector thereof is connected to the base of another (PNP) transistor $Tr_2$ by way of a resistor $r_3$. The emitter of the PNP transistor $Tr_2$ is connected to the output terminal Q while the collector thereof is connected to the anode of the diode $D_1$ or the set terminal S of the driver circuit 8 and to one end of the solenoid of a relay RL. Thus, a positive feed back path is formed between the two transistors in such a manner that the transistors continue to be in their conductive states once they have become conductive irrespective of the subsequent state of the input terminal S. The other end of the solenoid of the relay RL is connected to the second reset terminal $R_2$. The common contact of the relay RL is connected to the anode of the diode $D_3$ or the output terminal Q of the driver circuit 8. The normally closed contact of this relay RL is directly grounded while the normally open contact thereof is connected to the positive power line $V_+$.

Now, the operation of the present embodiment is described in the following.

When the door is opened from its closed state, the door switch 4 closes and pulls down the inputs to the first one-shot multivibrator 5 and the inverter 7. Referring now to FIG. 2, this causes the transistors $Tr_1$ and $Tr_2$ into conductive states and energizes the relay RL. As a result, the normally open contact is connected to the common contact, and the positive power line $V_-$ is directly connected to the output terminal Q. Since the collector of the transistor $Tr_2$ is connected to the base of the transistor $Tr_1$ by way of the diode $D_1$ and the resistor $r_1$, the transistors continue to be in the conductive states even after the input S has ceased to be in the high state. Thus, the first one-shot multivibrator 5 sets the first driver circuit 8 into the self-retained state for driving the motor 1 in the normal direction. This self-retained state is broken when the limit switch 16 connected to the second reset input $R_2$ of the driver circuit 8 is opened when the movable end of the seat belt has reached an end of its stroke.

At the same time, the output signal from the one-shot multivibrator 5 is also supplied to the trigger circuit 15 via the OR circuit 14, thereby causing the timer circuit 13 to start producing a high-level output signal. As shown in FIG. 2, as long as the first reset input $R_1$ is in high state, the driver circuit 8 continues to be energized. but when the timer circuit 13 times up, the first reset input $R_1$ is pulled down, and the self-retained state of the driver circuit 8 is broken, thereby de-energizing the relay RL and stopping the motor 1.

Thus, when the door is opened and the door switch 4 is closed, the motor 1 is driven in the direction to move the moveable end of the seat belt out of the way for the vehicle occupant who is about to get off the vehicle. When the moveable end of the seat belt has reached the end of the stroke, the limit switch 16 is opened and the driver circuit 8 is reset into a non-active state for stopping the drive of the motor 1. If the moveable end is held at an intermediate position for any reason, the supply of electric current to the motor 1 is discontinued when the timer circuit 13 has timed up and reset the driver circuit 8 by way of the OR circuit 11. Therefore, the overloading of the motor 1 is prevented in either case.

The door switch 4 is connected to the second one-shot multivibrator 6 for the reverse rotation of the motor 1 by way of an inverter 7. Therefore, when the door switch 4 is closed (when the door is open), a low signal is applied to the one-shot multivibrator 6, thereby keeping it disabled, and the driver circuit 9 for the reverse rotation of the motor 1 would not be activated. On the other hand, when the door switch 4 is opened (when the door is closed), the second driver circuit 9 for the reverse rotation of the motor 1 is activated but the first driver circuit 8 would not be activated.

When the door is repeatedly opened and closed immediately after opening the door, the one-shot multivibrators 5 and 6 produce their outputs in alternating manner and the timer circuit 13 is reinitialized each time by way of the trigger circuit 15. Therefore, timer circuit 13 always runs for the predetermined period of time following the last initialization of the timer circuit 13 by either one of the one-shot multivibrators 5 or 6. Therefore, the moveable end of the seat belt can reach either one of the ends of its stroke depending on the last condition of the door.

Figure 3:
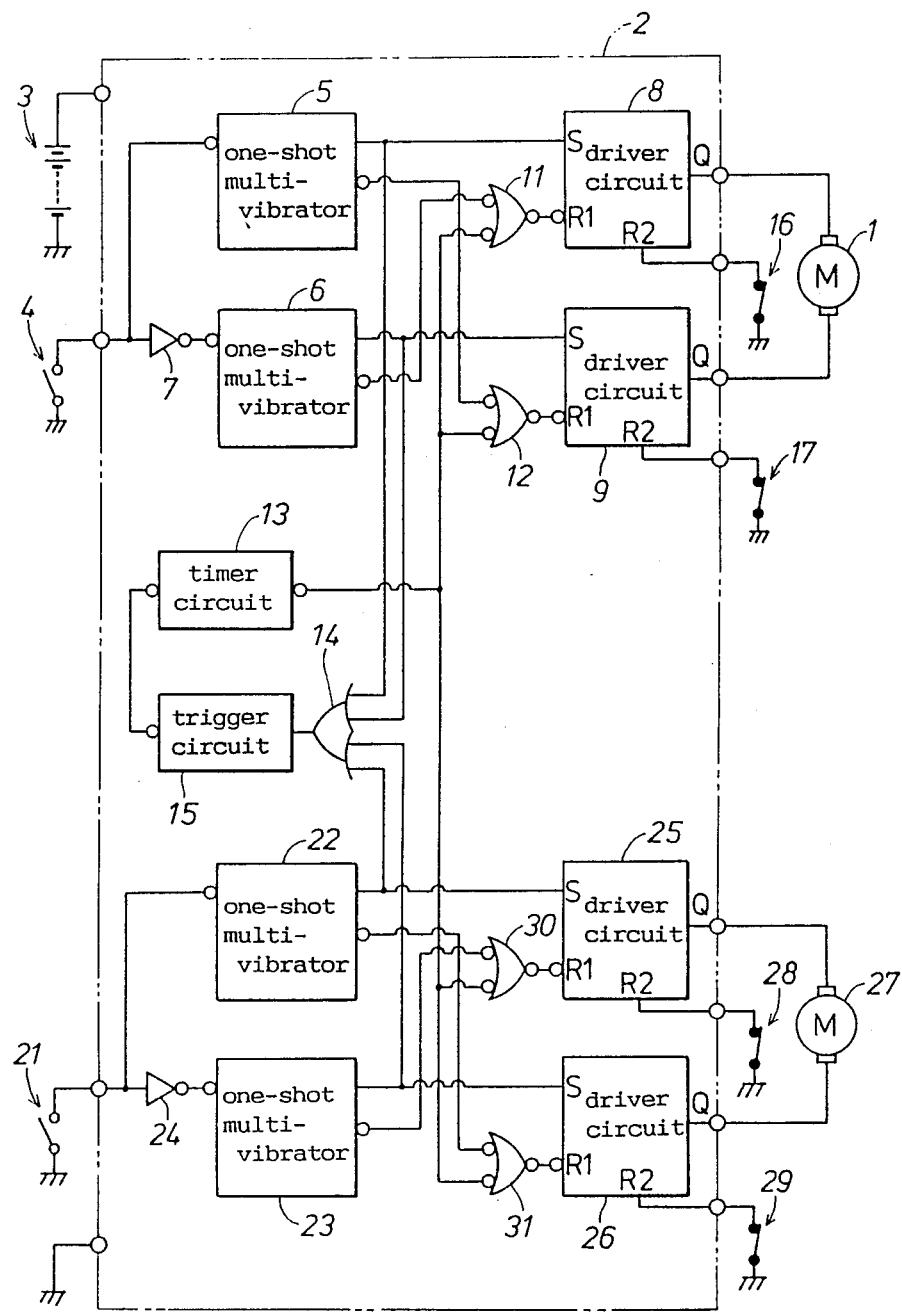
FIG. 3 is a block diagram of a second embodiment of the present invention.

FIG. 3 shows another embodiment of the present invention, and the parts corresponding to those of the previous embodiments are denoted with like numerals. This embodiment can serve as a common control circuit for two passive seat belt systems, for instance for the two front seats of a vehicle.

As shown in FIG. 3, this control circuit comprises, in addition to the structure illustrated in FIG. 1, another pair of one-shot multivibrators 22 and 23. The door switch 21 for the other door similar to the door switch 4 is connected directly to the input of one of the one-shot multivibrators 22 and, via an inverter 24, to the input of the other one-shot multivibrator 23. These one-shot multivibrators 22 and 23 also produce a pulse of a short duration upon pulling up of their inputs.

The output of the first one-shot multivibrator 22 is connected to a set terminal S of a first driver circuit 25 for driving the other motor 27 for the other passive seat belt system in the normal direction while the output of the second one-shot multivibrator 23 is connected to a set terminal S of another driver circuit 26 for driving the motor 27 in the reverse direction. The inverted output of the first one-shot multivibrator 22 is connected to a first reset input $R_1$ of the second driver circuit 26 by way of an OR circuit 31, and the inverted output of the second one-shot multivibrator 23 is connected to a first reset input $R_1$ of the first driver circuit 25 by way of another OR circuit 30.

The output terminals of the two one-shot multivibrators 22 and 23 are also connected to the additional two inputs of the OR circuit 14 which is common to the other part of the control circuit for controlling the motor 1 for the other passive seat belt system.

Further, second reset terminals $R_2$ of the driver circuits 25 and 26 are connected to limit switches 28 and 29 which are normally closed but open when the moveable end of the seat belt has reached the corresponding ends of the stroke thereof.

Thus, the output signals from the four one-shot multivibrators 5, 6, 22 and 23 are connected to the respective input terminals of the OR circuit 14, and any one of them can re-initialize the timer circuit 13. In this way, a plurality of motors can share a single timer circuit. This is advantageous because a timer requires a large capacitor or a complicated circuit such as a counter circuit, and the reduction of the number of timer circuits for a given number of motors to be controlled means a substantial reduction in the cost and size of the control circuit.

Although the present invention has been described in terms of the embodiments as applied to passive seat belt systems, the present invention can be applied to other systems where electric motors are utilized for achieving a reciprocating movement of a part of a system. Also, various parts of the disclosed embodiments can be replaced with other equivalent means without departing from the spirit of the present invention. For instance, the driver circuits 8, 9, 25 and 26 may be each replaced with a combination of a flip-flop circuit and a normal driver circuit without any difficulty for a person skilled in the art.

What we claim is:

1. A control circuit for reversible control of the rotation of a motor, comprising:
    switch means for producing a selection signal for selecting the rotational direction of the motor;
    timer means which is initialized every time said switch means is actuated and produces a pulse signal when a predetermined time period has passed from the time it is initialized;
    driver means which can take a first state for driving said motor in a first direction, a second state for driving said motor in a second direction, and a third state for not driving said motor in either direction;
    said driver means comprising a first input for receiving said selection signal from said switch means to produce said first or second state of said driver means selected by said switch means, self retaining means which keeps said driver means in said first or second selected state once and whenever either said first or second state of said driver means is produced, and a reset input for receiving said pulse signal from said timer means for breaking said self retained state of said driver means to produce said third state of said driver means.

2. A control circuit for reversible control of a motor as defined in claim 1, wherein said switch means comprises a pair of one-shot multivibrators, an inverter connected to the input of one of said multivibrators, and a switch connected to the inputs of the other multivibrator and said inverter.

3. A control circuit for reversible control of a motor as defined in claim 2, wherein said driver means comprises a pair of driver circuits each of which is connected between the output of said one-shot multivibrator and one end of said motor.

4. A control circuit for reversible control of a motor as defined in claim 3, wherein the outputs of said one-shot multivibrator are connected to the inputs of an OR circuit whose output is connected to said timer means to initialize said timer means and cause said timer means to produce an output signal in response to the output signal from said one-shot multivibrator.

5. A control circuit for reversible control of a motor as defined in claim 4, wherein each of said driver circuit comprises a self-retaining circuit including a positive feed-back line.

6. A control circuit for reversible control of a motor as defined in claim 4, wherein each of said driver circuit comprises a RS latch circuit.

7. A control circuit for reversible control of a motor as defined in claim 1, wherein said driver means comprises a second reset input which receives an output from a limit switch for detecting an end of the stroke of said motor.

8. A control circuit for reversible control of a motor as defined in claim 1, wherein said timer means is shared by a plurality of sets of said switch means and said driver means for controlling two different motors.

* * * * *